May 19, 1953 B. H. LEONARD, JR 2,639,172
FLOATING CONNECTION
Filed March 4, 1952
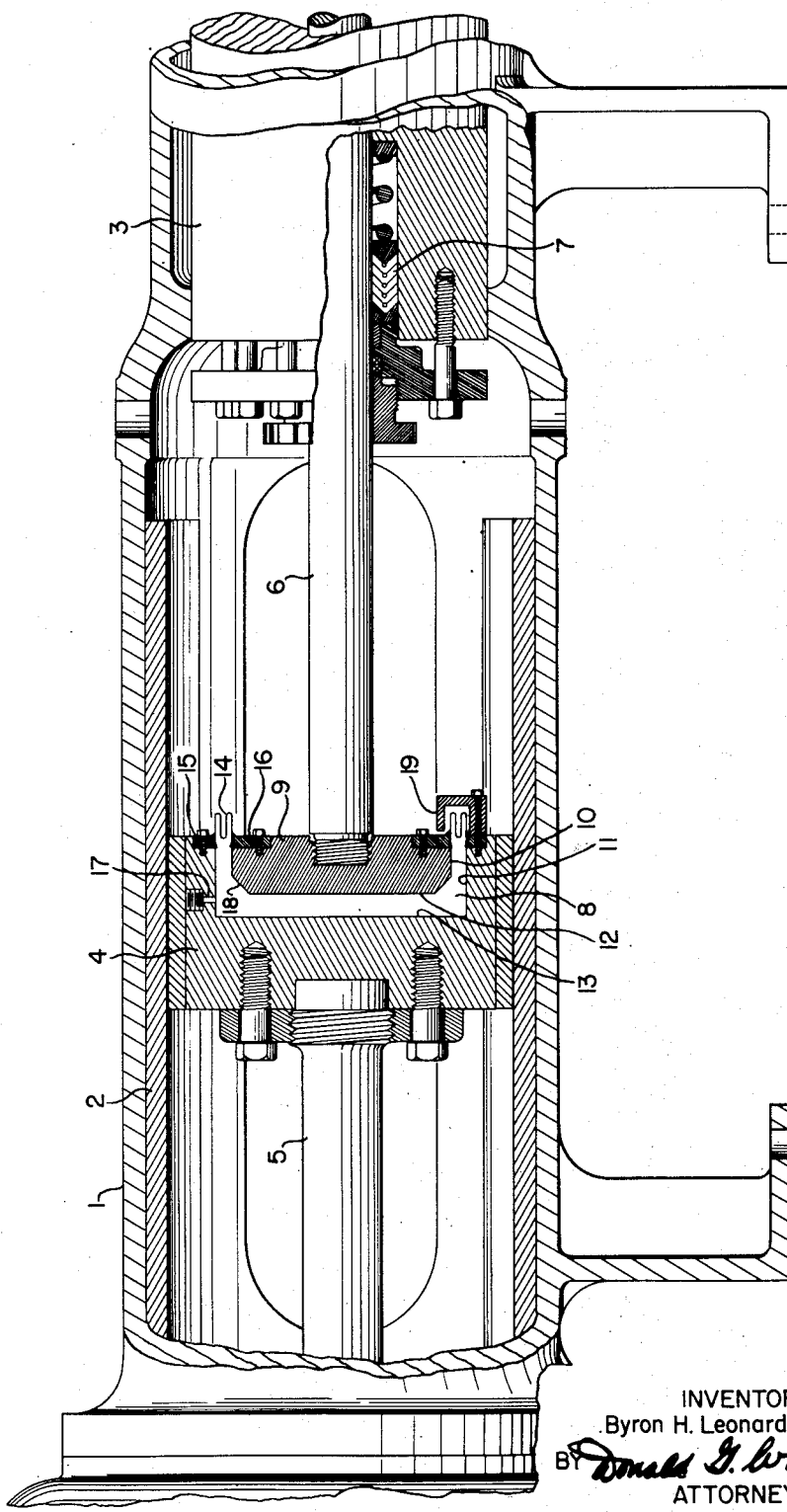
INVENTOR
Byron H. Leonard, Jr.
BY Donald G. Webb
ATTORNEY Patented May 19, 1953

2,639,172

UNITED STATES PATENT OFFICE 2,639,172

FLOATING CONNECTION

Byron H. Leonard, Jr., St. Louis, Mo., assignor to the United States of America as represented by the Secretary of the Interior Application March 4, 1952, Serial No. 274,819

8 Claims. (Cl. 287—85)

(Granted under Title 35, U. S. Code (1952), sec. 266)

The invention herein described and claimed may be manufactured and used by or for the Government of the United States of America for governmental purposes without the payment of royalties thereon or therefor.

This invention relates to an improved floating joint for connecting a pair of separately guided reciprocating members, such as a crosshead and a plunger.

It is often desirable to provide a floating connection, rather than a rigid one, between two separately guided members, one of which is driven by the other in rectilinear reciprocation along substantially the same axis. In such an arrangement, because of machining difficulties, or required running tolerances, it is usually extremely difficult, or impossible, to maintain perfect alignment of the axes of the separate guides. Both angularity (the axes of the separate guides are askew to one another) and offset (the axes of the separate guides are parallel, but laterally offset from one another) are encountered. For example, in high pressure equipment employing reciprocating plungers, such as in high pressure pumps, wherein the plunger is usually connected to the driver by means of a guided crosshead or yoke, it is essential that the plunger run absolutely true through the packing with very close clearances in order to effect a seal. Sidewise thrust on the plunger because of angularity or offset between the crosshead guides and the bore of the plunger would soon damage the packing and cause leakage. With such an arrangement, the running clearance needed between the crosshead or yoke and its guide must be considerably larger than that which can be tolerated through the packing. Even if these tolerances were not considered, very accurate machining would be required to prevent angularity and offset between the axes of the plunger bore and the guides. To remedy this, a flexible joint is sometimes employed to connect the plunger to the driving member so that, throughout its stroke, the plunger is guided through the packing by the packing unit alone with the result that, within limits, angularity and offset between the axes of the plunger bore and the guides will not affect the guiding of the plunger.

Various types of flexible joints for this purpose have been previously proposed, but these joints are usually of a purely mechanical type, permitting a certain amount of sliding play between the elements. Because sliding friction is involved, these joints are often unduly stiff. Furthermore, many of these prior connections permit only lateral play, thus compensating only for offset, and not angularity, between the axes of the reciprocating members.

The principal object of this invention is to provide a floating connection between two separately guided reciprocating members which is free from mechanical friction, and which compensates for both angularity and offset between the axes of the separate guides. Other objects of the invention will be apparent from the description which follows.

Broadly, the invention is characterized by the fact that the force exerted by the driving member is transmitted to the driven member through a fluid cushion. The fluid is contained in a chamber carried by one of the reciprocating members. A plug, carried at the end of the other reciprocating member fits into the open end of the chamber, and occupies a portion of its volume. The plug is so dimensioned as to occupy the greater portion of the open end of the chamber, leaving a small clearance between its periphery and the adjacent walls of the chamber. A clearance is likewise provided between the bottom side of the plug and the bottom of the chamber. A flexible sealing means is connected across the periphery of the plug and the adjacent walls of the chamber so as to close the gap between the two, and to seal the fluid in the chamber. With this arrangement, the force exerted by the driving member during its forward stroke is transmitted to the driven member through the fluid contained in the chamber. By virtue of the flexibility of the sealing means connecting the plug to the chamber, and because of the clearances between the periphery of the plug and the adjacent walls of the chamber, and between the bottom of the plug and the bottom of the chamber, the plug (and consequently the member to which it is attached) is permitted to move relatively of the driving member in all directions in an amount sufficient to compensate for both angularity and offset between the separate guides for the two reciprocating members.

For a better understanding of the invention, and for a fuller description thereof, reference is now made to the accompanying drawing which illustrates its use in a high pressure pump.

The single figure is a view, partly in section, showing the crosshead and plunger assembly and the floating joint connecting the two.

In the drawings, the reference numeral 1 refers to a steel yoke which supports, in proper alignment, the crosshead guides 2 and the pump cylinder 3. The crosshead 4, sliding in the guides 2, is driven by drive rod 5 by suitable means, not shown. The pump plunger 6 is driven by the crosshead 4, and runs in a bore provided with a suitable packing 7.

A cylindrical recess is provided in the forward end of the crosshead. This recess forms a chamber 8, having an open end facing the plunger 6. A cylindrical plug 9, fastened to the end of the plunger 6, fits into the open end of the chamber 8, occupying a portion of its volume. As may be seen, the plug 9 occupies the greater portion of the open end of the chamber, leaving only a relatively small clearance between the periphery 10 of the plug and the adjacent walls 11 of the chamber. It will likewise be noted that the plug is so arranged in the chamber that a clearance is left between the bottom 12 of the plug and the bottom 13 of the chamber. For the sake of clarity of illustration, the clearance between the periphery of the plug and the side walls of chamber 8, and between the bottom of the plug and the bottom of the chamber, have been exaggerated. Actually, in ordinary applications, these clearances need be of the order of a quarter of an inch, since ordinarily the amount of angularity and offset encountered will not require larger clearances. It is particularly desirable to maintain relatively small clearances between the periphery of the plug and the side walls of the chamber since, in this way, the area of the flexible diaphragm or other flexible sealing means closing the gap therebetween, is kept small, and consequently the total pressure exerted by the fluid in the chamber on the diaphragm during the pressure stroke of the plunger is kept correspondingly small.

A flexible diaphragm 14, which is preferably of the bellows-type, as illustrated in the drawing, is connected across the gap between the periphery of the plug and the adjacent walls of the chamber. As can be seen, the annular, bellows-type diaphragm 14 is connected, by welding for example, to a pair of annular supports 16 and 15, which are bolted, or otherwise attached to the plug 9 and to the crosshead 4, respectively. The diaphragm may be constructed of any suitable strong, flexible material such as light gauge steel, neoprene; the strength required depends on the magnitude of the fluid force developed in cavity 8.

The portion of the chamber 8 not occupied by the plug 9 is completely filled with a fluid of suitable characteristics. A liquid such as brake fluid, or other type of fluid usually employed in hydraulic systems, is most suitable. A gas under high pressure could also be used. Ports, such as port 17, are provided for introducing the fluid into chamber 8.

It will be apparent that, during the forward or pressure stroke, the force exerted by the crosshead is transmitted through the fluid in chamber 8 to plug 9, carried by the plunger. Sufficient clearance is permitted between the periphery of the plug 9 and the adjacent walls of the chamber, and between the bottom of the plug and the bottom of the chamber, to allow for any angularity and offset which is likely to occur between the crosshead guides and the bore of the plunger. With this arrangement, it is apparent that the plunger will always run true through the packing, being freely guided by the packing unit alone irrespective of such angularity and offset. As shown in the drawing, the rear edges of the plug are preferably beveled as at 18 to permit greater freedom of movement of the plug in tilting to take care of angularity between the crosshead guides and the plunger bore.

Since, on the return stroke, the flexible diaphragm 14 is the only connecting link between the plunger and the crosshead it will be desirable to provide auxiliary means, which are inoperative on the forward stroke, to remove the strain on the diaphragm on the return stroke. Thus, if the diaphragm 14 is not sturdy enough to overcome packing friction and the inertial forces involved, rigid connections may be provided, such as the U-shaped member 19. As may be seen in the drawing, the member 19 is fastened to the crosshead and is so arranged that it bears upon the plug 9 only during the return stroke, thus relieving the strain upon the diaphragm, and preventing its rupture. Preferably, three or more of the supports 19 are employed, spaced around the circumference of the chamber, or instead, an annular U-shaped member could extend around the entire circumference of the chamber forming a continuous support.

According to the preferred embodiment of the invention, the diameter of the plug 9 is considerably larger than the bore in which the plunger works. This has the effect of reducing the pressure developed in the fluid in chamber 8 during the forward or pressure stroke. For example, if the plunger 6 were pressuring against a force of 10,000 lbs. per sq. in., and the ratio of the diameter of a plunger bore to the diameter of the plug 9 was 1:10, the pressure developed in the fluid in the chamber 8 would be only 1,000 lbs. per sq. in. This is an important feature, since the total pressure developed in the fluid in the chamber 8 determines the necessary wall thickness of the diaphragm 14 and the wall thickness determines the flexibility of the diaphragm. The more flexible the diaphragm, of course, the greater freedom of movement which is permitted to the plunger 6 in aligning itself with its bore.

It is to be understood of course, that the invention has applications other than that described above and that many modifications of the structure shown are possible within the scope of the invention. Consequently, the invention is not to be limited by the specific embodiment illustrated, but only by the scope of the appended claims.

I claim:

1. In a device comprising two connected members, one driven by the other, and each separately guided for rectilinear reciprocation along substantially the same axis, whereby slight angularity and offset is likely to occur between the axes of the separate guides, an improved floating connection between said members including a chamber having an open end carried by one of said members, a plug carried by the other of said members fitting into the open end of said chamber and occupying a portion of its volume, said plug being dimensioned so as to occupy the greater portion of the open end of said chamber, leaving a small clearance between its periphery and the adjacent walls of said chamber, said plug likewise being arranged so as to leave a clearance between its bottom side and the bottom of said chamber, flexible sealing means connected across the periphery of said plug and the adjacent walls of said chamber so as to close the gap therebetween, the remaining portion of said chamber unoccupied by said plug being filled with a fluid, whereby the force exerted by said driving member is transmitted to said driven member through said fluid, thereby permitting automatic compensation for both angularity and offset between the axes of said separate guides.

2. A device in accordance with claim 1 in which said flexible sealing means is a bellows-type diaphragm.

3. A device in accordance with claim 1 which is provided with means, inoperative on the forward stroke of the driving member, for supporting said plug on the return stroke, and thereby preventing rupture of said flexible sealing means.

4. In a device comprising two connected members, one driven by the other, and each separately guided for rectilinear reciprocation along substantially the same axis, whereby slight angularity and offset is likely to occur between the axes of the separate guides, an improved floating connection between said members including a recess in one of said members forming a chamber therein having an open end facing toward the other of said members, a plug carried by the other of said members fitting into the open end of said chamber and occupying a portion of its volume, said plug being dimensioned so as to occupy the greater portion of the open end of said chamber, leaving a small clearance between its periphery and the adjacent walls of said chamber, said plug likewise being arranged so as to leave a clearance between its bottom side and the bottom of said chamber, a flexible diaphragm connected across the periphery of said plug and the adjacent walls of said chamber so as to close the gap therebetween, the remaining portion of said chamber unoccupied by said plug being filled with a fluid, whereby the force exerted by said driving member is transmitted to said driven member through said fluid, thereby permitting automatic compensation for angularity and offset between the axes of said separate guides.

5. In a device comprising a reciprocating, separately guided driving member, connected to a plunger working in a bore having substantially the same axis as the guide for said driving member, whereby slight angularity and offset is likely to occur between the axis of said guide and the axis of said bore, an improved floating connection between said driving member and said plunger including a chamber having an open end carried by said driving member, a plug carried at the end of said plunger fitting into the open end of said chamber and occupying a portion of its volume, said plug being dimensioned so as to occupy the greater portion of the open end of said chamber, leaving a small clearance between its periphery and the adjacent walls of said chamber, said plug likewise being arranged so as to leave a clearance between its bottom side and the bottom of said chamber, a flexible diaphragm connected across the periphery of said plug and the adjacent walls of said chamber so as to close the gap therebetween, the remaining portion of said chamber unoccupied by said plug being filled with a fluid, whereby the force exerted by said driving member is transmitted to said plunger through said fluid, the clearance between the periphery of said plug and the adjacent walls of said chamber, and the clearance between the bottom of said plug and the bottom of said chamber, being sufficient to permit said plug to move relatively of said chamber in all directions in an amount sufficient to compensate for both angularity and offset between the respective axes of said guide and said bore.

6. A device in accordance with claim 5 in which the diameter of said plug is substantially greater than the diameter of said bore so as to substantially reduce the pressure developed in said fluid during the pressure stroke of said plunger.

7. A device constructed in accordance with claim 5 which is provided with means, inoperative on the forward stroke of said driving means, for supporting said plug on the return stroke, and thereby preventing rupture of said flexible diaphragm.

8. In a device comprising a reciprocating, separately guided driving member connected to a plunger working in a bore having substantially the same axis as the guide for said driving member, whereby slight angularity and offset is likely to occur between the axis of said guide and the axis of said bore, an improved floating connection between said driving member and said plunger including a recess in said driving member forming a chamber therein having an open end facing toward said plunger, a plug carried at the end of said plunger fitting into the open end of said chamber and occupying a portion of its volume, said plug being dimensioned so as to occupy the greater portion of the open end of said chamber, leaving a small clearance between its periphery and the adjacent walls of said chamber, said plug likewise being arranged so as to leave a clearance between its bottom side and the bottom of said chamber, a flexible bellows-type diaphragm connected across the periphery of said plug and the adjacent walls of said chamber so as to close the gap therebetween, the remaining portion of said chamber unoccupied by said plug being filled with a fluid, whereby the force exerted by said driving member is transmitted to said plunger through said fluid, the clearance between the periphery of said plug and the adjacent walls of said chamber, and the clearance between the bottom of said plug and the bottom of said chamber, being sufficient to permit said plug to move relatively of said chamber in all directions in an amount sufficient to compensate for both angularity and offset between the respective axes of said guide and said plunger, the diameter of said plug being substantially greater than the diameter of said bore so that the pressure developed in said fluid during the pressure stroke of said plunger is substantially reduced.

BYRON H. LEONARD, Jr.

References Cited in the file of this patent

UNITED STATES PATENTS

| Number | Name | Date |
|---|---|---|
| 1,560,492 | Powell | Nov. 3, 1925 |
| 1,642,211 | Langdon | Sept. 13, 1927 |
| 1,909,768 | Jones | May 16, 1933 |